(12) United States Patent　(10) Patent No.:　US 7,466,347 B2
Tsunoda　(45) Date of Patent:　Dec. 16, 2008

(54) DIGITAL CAMERA DEVICE HAVING DOCUMENT DRAFTING SYSTEM

(75) Inventor: Naoki Tsunoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 839 days.

(21) Appl. No.: 10/026,624

(22) Filed: Dec. 27, 2001

(65) Prior Publication Data

US 2002/0135685 A1　Sep. 26, 2002

(30) Foreign Application Priority Data

Dec. 28, 2000　(JP)　............................ 2000-401592

(51) Int. Cl.
*H04N 5/76*　(2006.01)
(52) U.S. Cl. .................................. 348/231.2
(58) Field of Classification Search ............... 348/211.1, 348/231.2
See application file for complete search history.

(56) References Cited

U.S. PATENT DOCUMENTS

| | | | | |
|---|---|---|---|---|
| 6,035,323 | A  * | 3/2000 | Narayen et al. ............. | 709/201 |
| 6,223,190 | B1 * | 4/2001 | Aihara et al. ................ | 715/513 |
| 6,567,122 | B1 * | 5/2003 | Anderson et al. ......... | 348/211.3 |
| 6,571,271 | B1 * | 5/2003 | Savitzky et al. ............. | 709/200 |
| 6,738,075 | B1 * | 5/2004 | Torres et al. ................. | 715/723 |
| 6,779,153 | B1 * | 8/2004 | Kagle .......................... | 715/522 |
| 6,930,709 | B1 * | 8/2005 | Creamer et al. .......... | 348/211.3 |

FOREIGN PATENT DOCUMENTS

JP　　10-116295　　5/1998
JP　　2000-287110　　10/2000

OTHER PUBLICATIONS

English Translation of JP 2000-287110 (Tsunoda).*
U.S. Appl. No. 10/801,596, filed Mar. 17, 2004, Tsunoda.
U.S. Appl. No. 10/026,624, filed Dec. 27, 2001, Tsunoda.
U.S. Appl. No. 10/658,549, filed Sep. 10, 2003, Oka et al.

* cited by examiner

*Primary Examiner*—David Ometz
*Assistant Examiner*—Dillon Durnford-Geszvain
(74) *Attorney, Agent, or Firm*—Oblon, Spivak, McClelland, Maier & Neustadt, P.C.

(57) ABSTRACT

A template in HTML format is formed in a PC or the like, and this is taken in a digital camera device, and a single or a plurality of images are selected in the digital camera so as to carry out a process with templates being specified; thus, an image associating (pasting) process is executed in accordance with independent tags. At this time, only the sections corresponding to the independent tags are converted with the other sections being left as they are. This process makes it possible to describe those having a complex layout, and consequently to easily add a template.

7 Claims, 6 Drawing Sheets

```
<TEMPLATE>IMAGE INFORMATION DISPLAY</TEMPLATE>
<HTML>
<HEAD>
<TITLE>NP-1 Camera Folder</TITLE>
</HEAD>
<BODY BGCOLOR="#d1d1d1" LINK="#000000" VLINK="#ffffff">

<P><FONT SIZE="5" FACE="Times">Camera Folder</FONT>
<P><HR>

<TABLE WIDTH="540" BORDER="0" CELLSPACING="0" CELLPADDING="0">

<PASTEIMAGE SHOT="ALLINFO" WIDTH="320" HEIGHT="240">
</PASTEIMAGE>

</TABLE>
</BODY>
</HTML>
```

FIG.2B

```
<!-- TEMPLATE>IMAGE INFORMATION DISPLAY</TEMPLATE -->
<HTML>
<HEAD>
<TITLE>NP-1 Camera Folder</TITLE>
</HEAD>
<BODY BGCOLOR="#d1d1d1" LINK="#000000" VLINK="#ffffff">

<P><FONT SIZE="5" FACE="Times">Camera Folder</FONT>
<P><HR>

<TABLE WIDTH="540" BORDER="0" CELLSPACING="0" CELLPADDING="0">

<!-- PASTEIMAGE SHOT="ALLINFO" WIDTH="320" HEIGHT="240" -->
<TR>
<TD WIDTH="320" ALIGN="CENTER"><B>100RICOH/RIMG0001.jpg</B></TD>
<TD WIDTH="20"></TD>
<TD WIDTH="80"></TD>
<TD WIDTH="120"></TD></TR>
<TR>
<TD HEIGHT="260" ALIGN="CENTER" VALIGN="TOP"><AHERF="100RICOH/RIMG0001.jpg">
<IMG SRC="1000001.jpg" WIDTH="320" HEIGHT="240" ALT="1"></A></TD>
<TD></TD>
<TD ALIGN="LEFT" VALIGN="TOP"><FONT SIZE="3" FACE="Times"><PRE>File size
Resolution
Quality
Recording mode
AE
Light metering
Shutter speed
Aperture stop
Exposure comp.
Focasing mode
Flash mode
White balance
Digital zoom
Date
</PRE></FONT>
</TD>
<TD ALIGN="LEFT" VALIGN="TOP"><FONT SIZE="3" FACE="Times"><PRE> : 568Kbyte
 : 1280X960pixels
 : Super Fine
 : Single shutter
 : Programmed AE
 : Multiple
 : 1/125sec
 : F11
 : 0.00EV
 : AF
 : Off
 : Auto
 : -
 : 1998/08/20  3:14 pm
</PRE></FONT>
</TD></TR>
```

FIG.3

```
<TR>
<TD WIDTH="320" ALIGN="CENTER"><B>102RICOH/RIMG0003.jpg</B></TD>
<TD></TD>
<TD></TD>
<TD></TD></TR>
<TR>
<TD HEIGHT="260" ALIGN="CENTER" VALIGN="TOP"><A HERF="102RICOH/RIMG0003.jpg">
<IMG SRC="1020003.jpg" WIDTH="320" HEIGHT="240" ALT="2"></A></TD>
<TD></TD>
<TD ALIGN="LEFT" VALIGN="TOP"><FONT SIZE="3" FACE="Times"><PRE>File size
Resolution
Quality
Recording mode
AE
Light metering
Shutter speed
Aperture stop
Exposure comp.
Focusing mode
Flash mode
White balance
Digital zoom
Date
</PRE></FONT>
</TD>
<TD ALIGN="LEFT" VALIGN="TOP"><FONT SIZE="3" FACE="Times"><PRE> : 446Kbyte
 : 1280×960pixels
 : Super Fine
 : Single shutter
 : Programmed AE
 : Multiple
 : 1/250sec
 : F5.6
 : 0.00EV
 : AF
 : Off
 : Auto
 : -
 : 1998/08/20   1:21 pm
</PRE></FONT>
</TD></TR>
<!-- /PASTEIMAGE -->

</TABLE>
</BODY>
</HTML>
```

DIGITAL CAMERA DEVICE HAVING DOCUMENT DRAFTING SYSTEM

FIELD OF THE INVENTION

The present invention relates to a digital camera device provided with an HTML document drafting system which makes it possible to easily convert a still image picked up in the digital camera device to an HTML file at that place.

BACKGROUND OF THE INVENTION

In recent years, still images that have been picked up by a digital camera, a scanner device, or the like, and formed into files are frequently registered in Home pages on the Internet. Conventionally, still images, obtained by digital cameras, scanners, or the like, are once stored in PCs of the like through media or a communication unit such as serial/USB, and then directly edited by the user to form a HTML file using text editor or the like, or formed into a HTML file by using an exclusively-used HTML editor or the like. These are then registered as home pages in a predetermined server on the Internet. Here, the invention disclosed in Japanese Patent Application Laid-Open No. 10-116295 is exemplified as a related invention.

As described above, conventionally, still images, obtained by digital cameras, scanners, or the like, are once stored in PCs or the like through media or a communication unit, and the user directly edits these by handling codes of HTML by a text editor or the like, or an exclusively-used HTML editor or the like is used to form these into a HTML file. Then, these files are registered as home pages in a predetermined server on the Internet, therefore, upon editing or registering these, PCs are inevitably required, and it has not been possible to directly register these in the home pages from a digital camera.

SUMMARY OF THE INVENTION

It is an object of the present invention to provide a digital camera device that has an HTML document drafting system which makes it possible to easily convert a still image picked up in the digital camera device to an HTML file at that place.

Moreover, another object is to provide an HTML document drafting system which can directly register an HTML file formed in a digital camera device in a predetermined server on the Internet without using a PC.

Figure 2A:
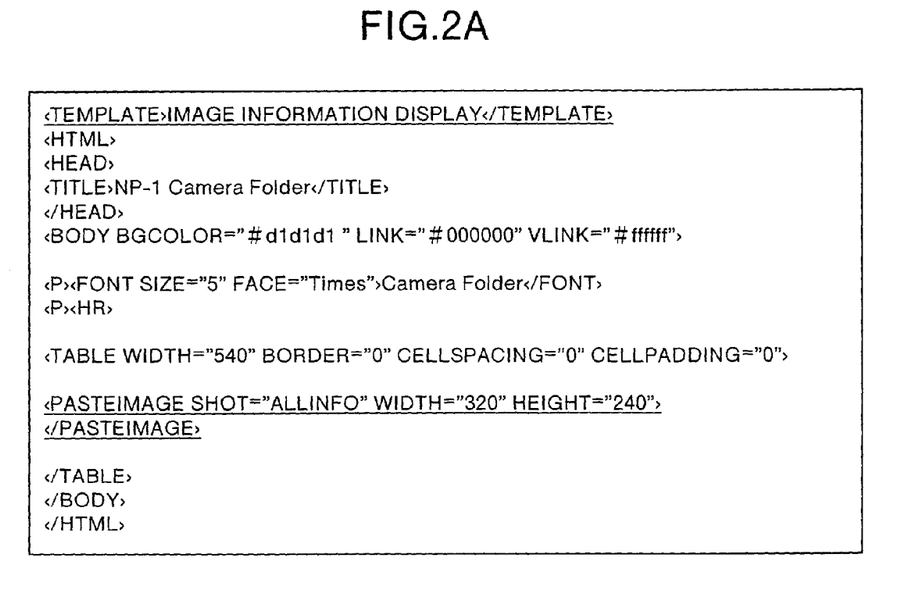
FIGS. 2A and 2B show samples of a template file in HTML format used in the digital camera device in accordance with one embodiment of the present invention.
Figure 2B:
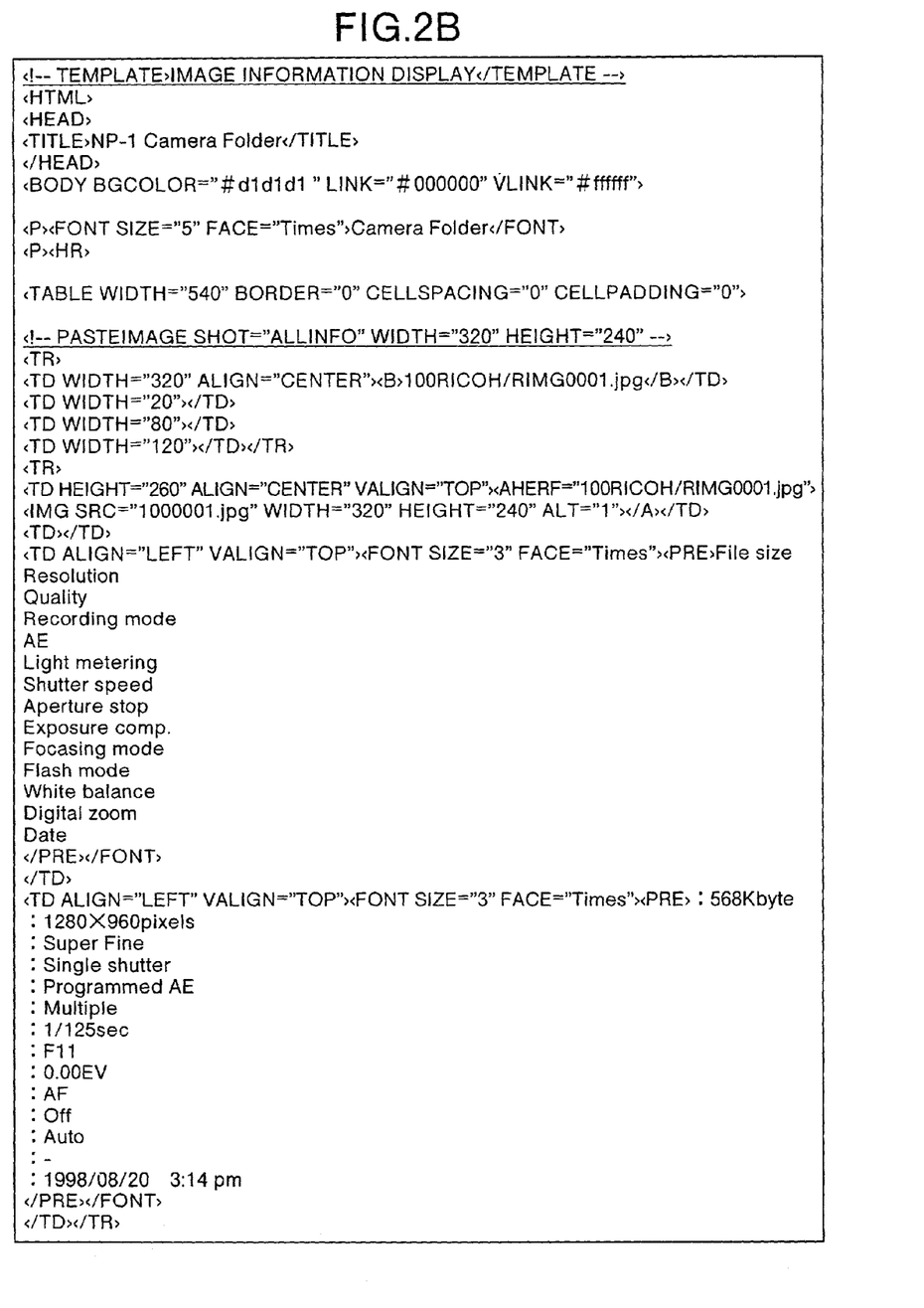
Figure 3:
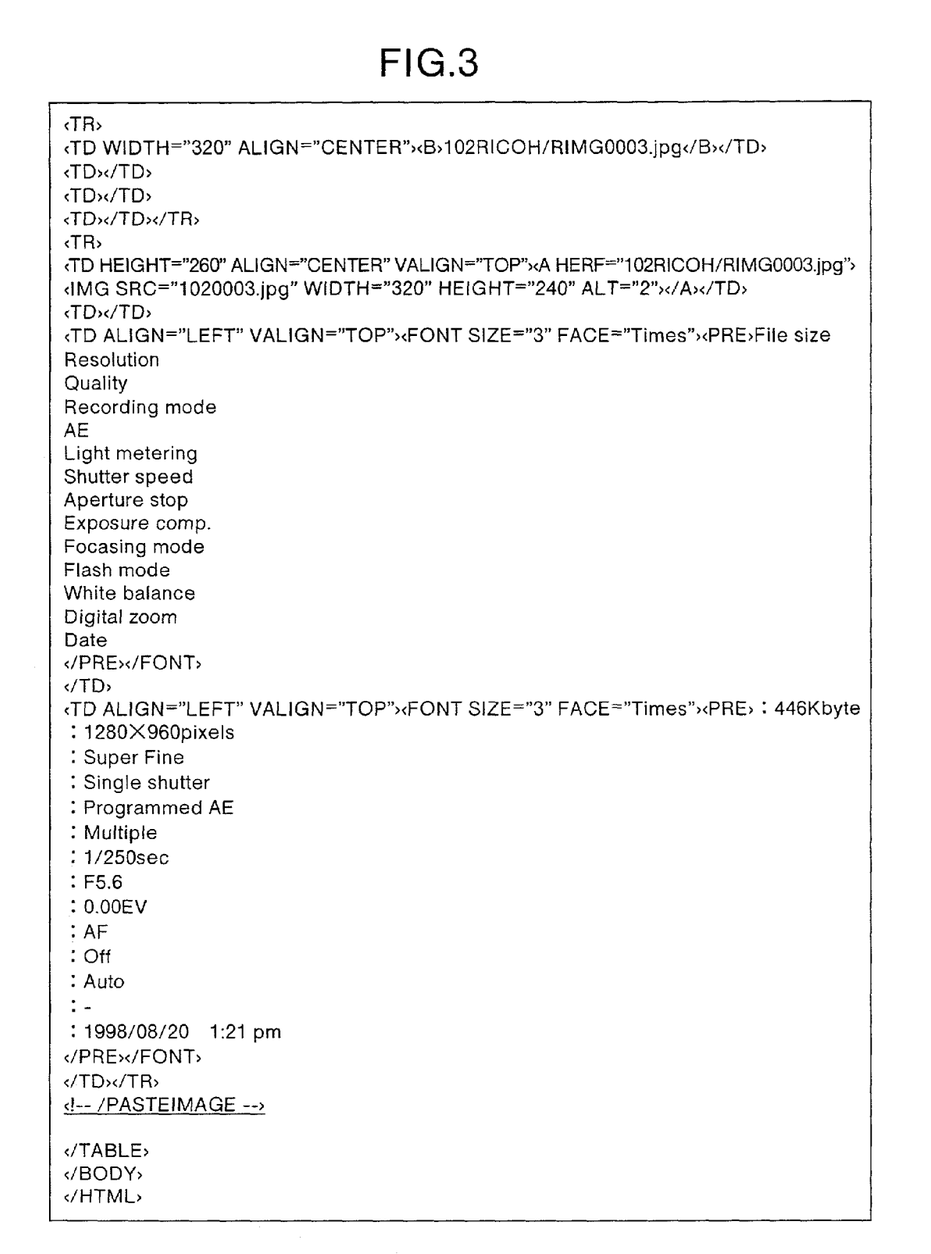
FIG. 3 shows a sample of codes in HTML format used in the digital camera device in accordance with one embodiment of the present invention.

According to a first aspect of the present invention, there is provided a digital camera device, which has functions for creating an HTML document file from a picked-up image and for taking out the HTML document file through a media and communication, or the like, further comprising, a unit which preliminarily registers a template in HTML format for creating an HTML file as shown in the following FIG. 2 in the digital camera device, a unit which uses a tag exclusively used for inserting a file of a picked-up image, a unit which automatically generates HTML codes as shown in FIG. 3 by inserting the image file in accordance with the tag used in the template shown in FIG. 2, a unit which, each time an HTML file is created, automatically forms a new directory to register the HTML file therein, a unit which, each time a picked-up image is linked to an HTML file, forms an image with a thumb-nail image size from the picked-up image in accordance with the exclusively-used tag and registers this in the same directory as the HTML file registered, and a unit which displays the image with the thumb-nail size on HTML codes with a link to the corresponding original picked-up image being pasted thereon.

According to this arrangement, a template is formed in HTML format by using a PC or the like, and this is taken into the digital camera, and when the template is specified so as to start a process with a single or a plurality of images being selected in the digital camera, an image-associating (pasting) process in accordance with independent tags is carried out. Since only the sections of the independent tags are converted with the other sections being left as they are, even those having a complex layout can be described so that a template is easily added.

A second aspect of the present invention provides the digital camera device according to the first aspect, further comprising, a unit which automatically creates a directory in accordance with DCF standard, each time the HTML document is created, a unit which, each time a picked-up image is linked to the HTML file, forms an image with a thumb-nail image size from the picked-up image, and registers this with a file name in accordance with DCF standard, and a unit which creates the registering file name by using DCF directory number and DCF file number so that the directory position of the picked-up image is recognized. According to this arrangement, it becomes possible to confirm an image that has been formed into an HTML document, through reproduction in a normal digital camera, and by preventing the original picked-up image from being duplicated on storage, it becomes possible to save the memory.

A third aspect of the present invention provides the digital camera device according to the first aspect, further comprising: a unit which automatically transfers a section of <IMG SRC . . . > tag in general-use HTML document to <PASTEIMAGE> tag as shown in FIG. 2. According to this arrangement, it becomes possible to easily register an HTML document, drafted by using an HTML editor or the like generally used in PCs, in a digital camera device.

A fourth aspect of the present invention provides the digital camera device according to the first aspect, further comprising, a unit which carries out an automatic transfer operation to <PASTEIMAGE> tag shown in FIG. 2 based upon a file name specified by a section of <IMG SRC . . . > tag in general use HTML document. According to this arrangement, an HTML document, which has been formed by using a general-use HTML editor after preliminarily registering an image file for an HTML document drafting plate, can be easily registered in a digital camera device.

A fifth aspect of the present invention provides the digital camera device according to the first aspect, further comprising, a unit which displays the HTML document drafting template, as shown in FIG. 2, registered in the digital camera device by using a dummy image file, and a unit which resets the exclusively-used tag section while displaying the HTML document drafting template. According to this arrangement, it becomes possible to re-edit the HTML document drafting template registered in the digital camera.

A sixth aspect of the present invention provides the digital camera device according to the first aspect, further comprising, a unit which automatically converts the exclusively-used tag of the HTML document drafting template, shown in FIG. 2, to comments, and a unit which recognizes the exclusively-used tag converted into comments and converts these comments into exclusively-used tag. According to this arrangement, the HTML drafting template, registered in the digital camera, is taken out to a PC, and after re-editing this by using a general-use HTML editor or the like, is again registered in the digital camera.

A seventh aspect of the present invention provides the digital camera device according to the first aspect, further comprising, a unit which, each time a picked-up image is linked to an HTML document, displays the size of the image file thus linked and the total size of image files that have been linked before; and a unit which enables to connect or disconnect the link of the original picked-up image to or from an image with a thumb-nail size on HTML document. According to this arrangement, it is possible to limit ever-increasing HTML file sizes for each image file section to be linked.

An eighth aspect of the present invention provides the digital camera device according to the first aspect, further comprising, a unit which, each time a picked-up image is linked to an HTML document, displays a total size of an image file thus linked, and a unit which, after forming an HTML document, reduces the size of the original picked-up image linked in a uniformed manner to a desired size. According to this arrangement, it is possible to control ever-increasing HTML file sizes to a desired size at once.

A ninth aspect of the present invention provides the digital camera device according to the first aspect, further comprising, a unit which, each time a picked-up image is linked to an HTML document, determines as to whether or not there is a sound relation file attached to the picked up image, a unit which, if there is any sound relation file, displays an icon indicating the existence of the sound relation file attached to the picked-up image linked to the HTML document; and a unit which links the sound relation file to the display icon. According to this arrangement, it is possible to link a sound relation file corresponding to a picked-up image to the corresponding HTML document.

A tenth aspect of the present invention provides the digital camera device according to the first aspect, further comprising, a unit which downloads a template file in HTML format from a predetermined home page on the Internet, by using a communication card including a modem card and an ISDN card; and a unit which registers the template file in HTML format that has been downloaded. According to this arrangement, the template file in HTML format, registered in the digital camera device, can be readily updated by way of the Internet.

Other objects and features of this invention will become understood from the following description with reference to the accompanying drawings.

DETAILED DESCRIPTIONS

Referring to attached drawings, the following description will discuss preferred embodiments of a digital camera in accordance with the present invention.

1. Functions as a Whole [Corresponding to the First Aspect]

1.1 Hardware Construction

Figure 1:
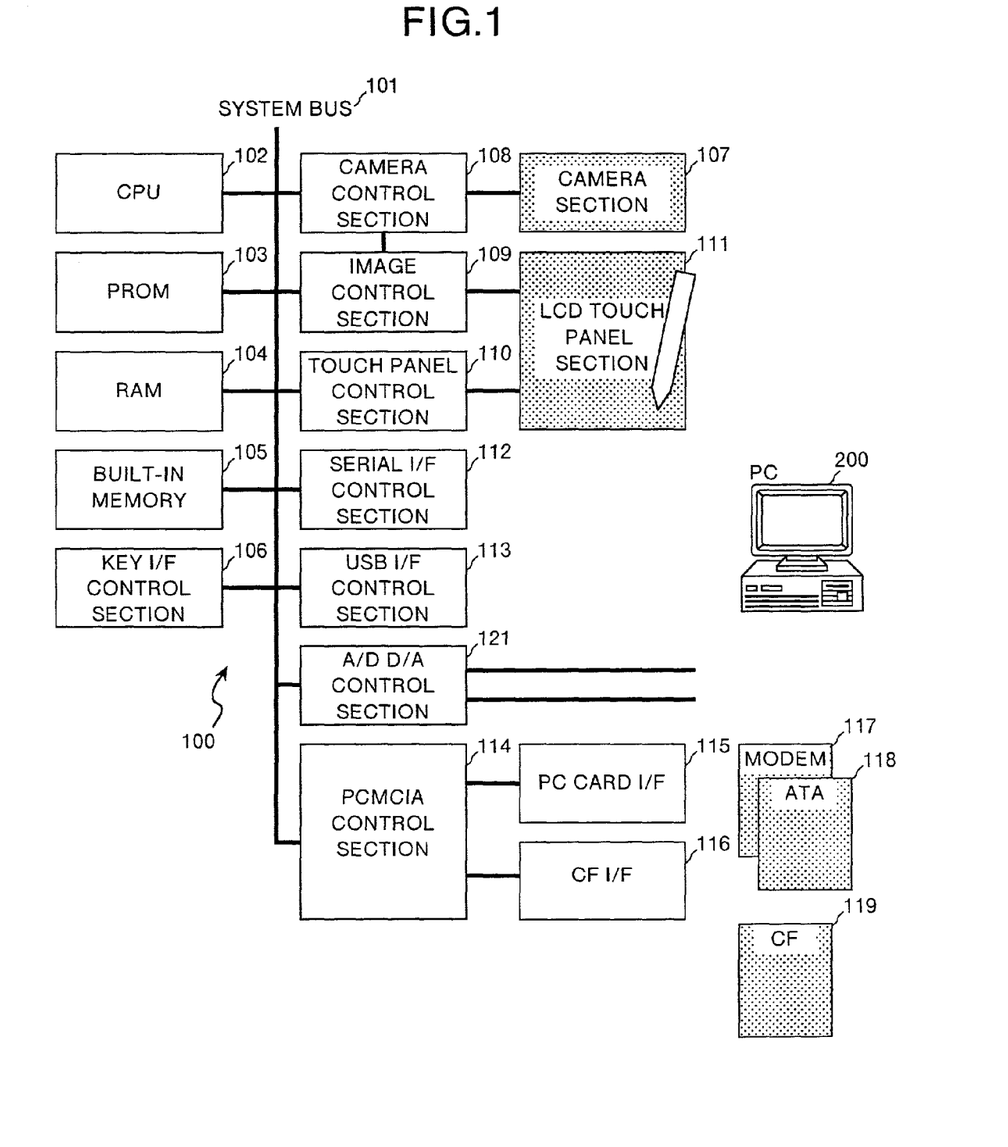
FIG. 1 is a block diagram which shows a system construction of a digital camera device in accordance with one embodiment of the present invention.

FIG. 1 is a block diagram which shows a hardware construction of a digital camera terminal in accordance with one preferred embodiment of the present invention.

As shown in FIG. 1, a digital camera 100 is provided with a CPU 102, a PROM 103, a RAM 104, a built-in memory 105, a key interface control section (hereinafter, interface is referred to as "I/F") 106, a camera section 107, a camera control section 108, an image control section 109, a touch panel control section 110, a LCD touch panel section 111, a serial I/F control section 112, a USBI/F control section, A/D, D/A control section 121, a PCMCIA control section 114, a PC card I/F 115, a CFI/F 116, a modem 117, an ATA 118, and a CF 119; and the respective sections except for the camera section 107, LCD touch panel section 111, PC card I/F 115, a compact flash CF I/F 116 (hereinafter, compact flash will be referred to as CF), modem 117, ATA 118 and CF 119, are connected to a system bus 101 so that these are allowed to mutually communicate with the CPU 102.

More specifically, the PROM 103 stores a program, and the RAM 104 serves as a work area of programs and data. In the built-in memory 105, image files that have been picked up, system files and data file, or the like, are stored, and the key I/F control section 106 has functions for detecting hard keys such as a shutter and a zoom key. The camera control section 108 controls the camera section 107, and the image control section 109 compresses an image acquired from the camera control section 108 into JPEG, decompresses JPEG data stored in the built-in memory 105, the ATA 118 and the CF 119, or the like, and outputs image data to the LCD section 11 as image signals.

The modem 117, the ATA 118 and the CF 119 are inserted to the PC, CARD I/F 115 and the CF I/F 116, and the A/D, D/A control section 120 inputs/outputs sound information, and these systems are constituted independently from the PC 200. 1.2 Flow of picked-up image files Picked-up image files in the above-mentioned system are allowed to flow as described below.

An image, picked up in the digital camera device, is converted to digital data from the camera section 107 through the camera control section 108, and distributed in an inner memory of the image control section 109. After the image information, stored in the image control section 108, have been compressed into JPEG in EXIF format, this is stored in storages such as the ATA 118 and CF 119 via the built-in memory 105 or the PCMCIA control section 114. The still image files stored in the storages are externally taken out through the storage such as the attachable/detachable ATA 118 or the CF 119, or externally taken out through the serial I/F control section 112 or the USB I/F control section 113, or taken out by using the communication function of the modem 117 via the PCMCIA control section 114.

1.3 HTML Format Template

FIG. 2 shows a sample of a template file in HTML format. Basically, the HTML template is preliminarily registered in the built-in memory 105 in the digital camera device 100 of FIG. 1 or in the PROM 103 as program codes. Since the built-in memory 105 is a non-volatile memory, the HTML template is registered as a file under the DOS file system that is dealt in PC or the like. The file format is basically general-use HTML codes; and, in order to HTML-encode a picked-up still image, exclusively-used tags are used, one example of exclusively-used tag is shown below:

<TEMPLATE> </TEMPLATE> Template title name cf. Index print template
Longitudinal template
Lateral 2-image template

```
<PASTEIMAGE    SHOT=param    WIDTH="xxx"
    HEIGHT="xxx" >
</PASTEIMAGE> Image paste tag
SHOT=Paste format
```

| param: ALLINFO | Paste all files selected with information. |
|---|---|
| SINGLEINFO | Paste one image with information |
| ALL | Paste all files selected |
| SINGLE | Paste one image |
| INDEX | Paste selected images as reduced images in lateral 5 rows |

WIDTH=Image size (width)
Thumb nail size, if omitted
HEIGHT=Image size (height)
Thumb nail size, if omitted.

1.4 Exclusively-used Tags

An explanation will be given of the exclusively-used tags, in more detail.

The above-mentioned <TEMPLATE> </TEMPLATE> tag defines the title of a template. Prior to automatically drafting the HTML file in the digital camera device, the defined template title name is displayed as a list on the LCD touch panel section 111 of FIG. 1, thereby allowing the user to desirably select the title. For example, the title name is displayed as follows:

"index display 01"
"index display 02"
"image display 01"
"image display 02"
"study-visit to show", or the like.

```
<PASTEIMAGE    SHOT=param    WIDTH="xxx"
    HEIGHT="xxx">
</PASTEIMAGE>
```
tag, which is a tag for pasting an image, is used for HTML encoding a picked-up still image. SHOT further defines the format as to how to paste the image. For example, (1) If ALLINFO is selected, then paste all the files selected with ALLINFO information.
(2) If SINGLEINFO is selected, then paste one image with information.
(3) If ALL is selected, then paste all the files selected.
(4) If SINGLE is selected, then paste one image.
(5) If INDEX is selected, then paste selected images as reduced images in lateral 5 rows.

With respect to the selection method, for example, a list of templates preliminarily registered in the device is displayed on the LCD display section 111 of the digital camera device 100 of FIG. 1. Next, selection is made from the still image files preliminarily picked up while being reproduced. After the selection, an HTML automatic drafting process is carried out.

Figure 4:
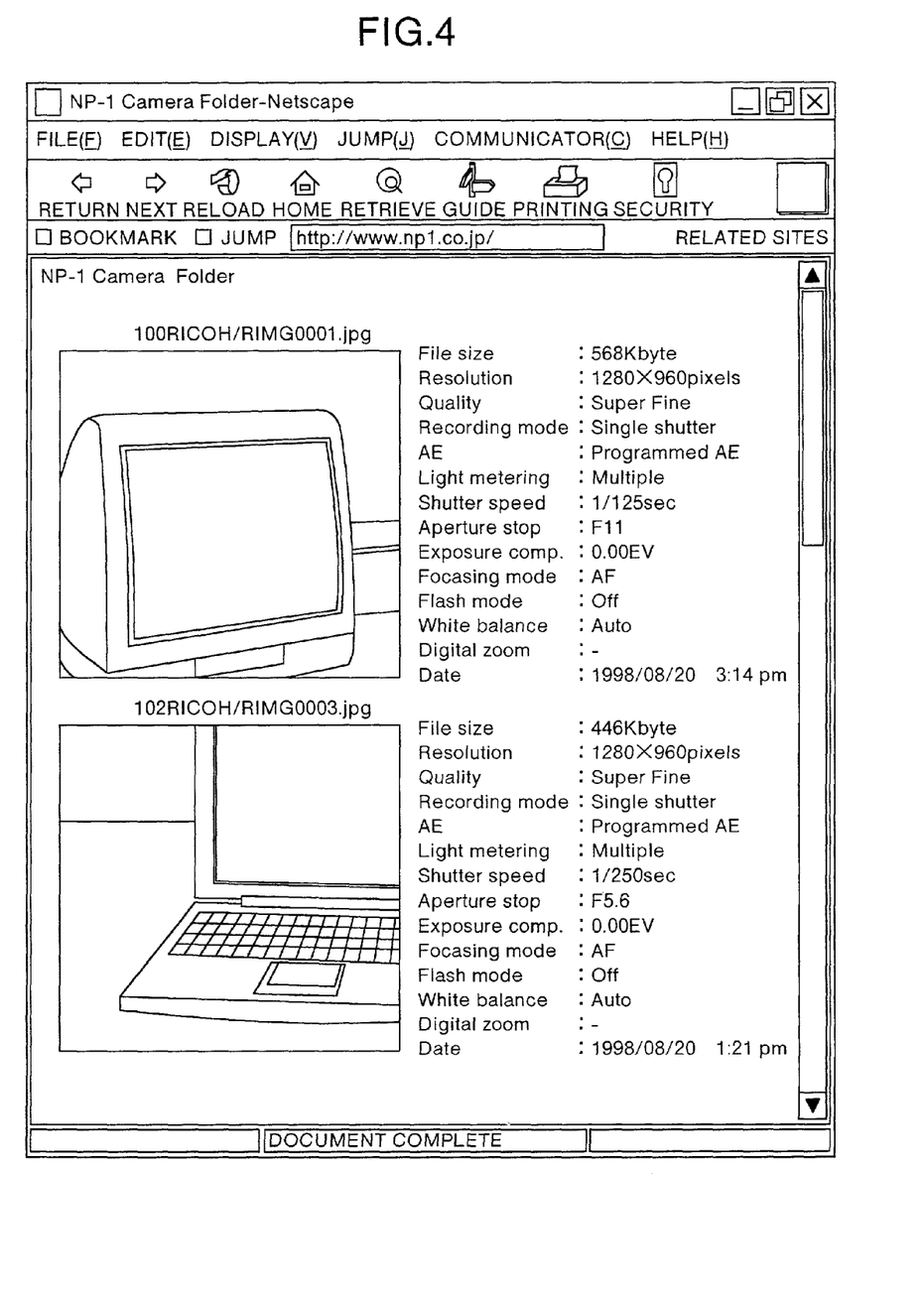
FIG. 4 shows one example of a browser display image sample.
Figure 5:
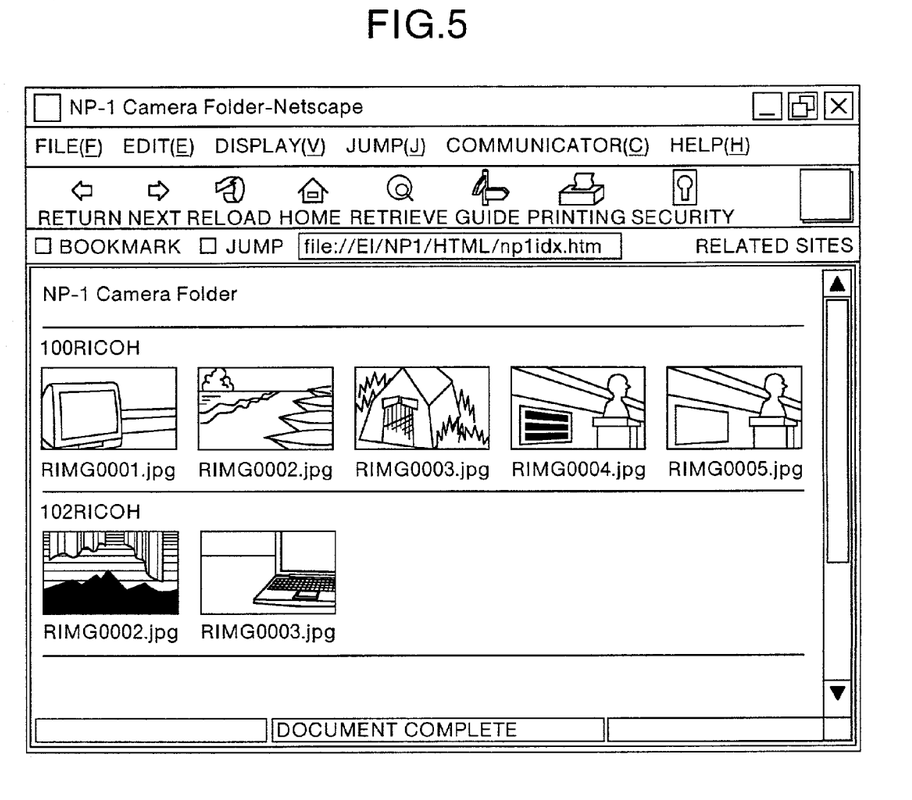
FIG. 5 shows another example of a browser display image sample.

FIG. 3 shows an HTML record sample. For example, the <PASTE IMAGE SHOT="ALLINFO" WIDTH="320" HEIGHT="240"> </PASTEIMAGE> tag, shown in FIG. 2, is automatically transferred to HTML codes corresponding a section sandwiched by <!--PASTEIMAGE SHOT="ALLINFO" WIDTH="320" HEIGHT="240"--> and <!--/PASTEIMAGE-->. In the case when the HTML file of FIG. 3 is drafted from the HTML template of FIG. 2, all exclusively-used tags in FIG. 2 are converted into commands; therefore, these are decoded without problems, even when viewed by a general-use browser or the like. FIGS. 4 and 5 show sample drawings of browser display images.

1.5 HTML File Registration

The following description will discuss files of picked-up still images, HTML templates, a directory construction of HTML files thus drafted and a file name construction. One example of a directory construction is shown below:

¥¥DCIM¥100RICOH¥RIMG0001.JPG
  ¥RIMG0002.JPG
  ¥RIMG0003.JPG
  ¥RIMG0004.JPG
  ¥RIMG0005.JPG
¥101RICOH¥RIMG0010.JPG
  ¥200RICOH
¥¥TEMPRATE¥TEMP0001.TMP
  ¥TEMP0002.TMP
  ¥TEMP0003.TMP
¥¥HTML¥001RHTML¥index.html
  ¥R1000001.JPG
  ¥R1000002.JPG
  ¥R1000003.JPG
  ¥R1000004.JPG
  ¥R1000005.JPG
  ¥R1000010.JPG Normal files of picked-up still images are stored in "¥¥DCIM¥xxxRICOH" (xxx corresponds to 100-999) and thereafter in accordance with DCF standard, and a name "RIMGxxxx.JPG" (xxxx corresponds to 0001-9999) is automatically given as a file name, and stored. Thus, any digital camera device in accordance with DCF standard is allowed to reproduce the still images even between different models. For example, a template of HTML format, shown in FIG. 2, has been preliminarily registered in a directory "¥¥TEMPRATE" and thereafter, with a file name of "TEMPxxxx.TMP" (xxx corresponds to 0001-9999). For example, in the case when, after selection of a template of HTML format of "¥¥TEMPRATE¥TEMP0001.TMP", all the still images located in directory "¥¥DCIM¥100RICOH", "¥¥DCIM¥101RICOH" and thereafter are selected as still images to be displayed in HTML files, the HTML files automatically drafted are registered as "¥¥HTML¥index.html". After the display of picked-up still image files has been HTML encoded, the still images are variably magnified to a resolution corresponding to the exclusively-used tag, and the file name is then changed to "RxxxYYYY.JPG" (xxx corresponds to directory number at which the original still image files are located, YYYY corresponds to file number of the original still image files). The still image files after the variable magnification are encoded so as to be directly displayed on HTML codes, and the original still image files are HTML-encoded so as to be linked to the still image files after the variable magnification.

After templates have been drafted in HTML format by a PC or the like by carrying out the above-mentioned processes, these are taken in the digital camera device, and a single or plurality of images are selected in the digital camera so as to start a process, with templates being specified, a process for associating images (pasting) in accordance with the independent tags is carried out. Since only the sections of the independent tags are transferred with the other sections being left as they are, it is possible to describe those having a complex layout and consequently to easily add a template.

2. File Registration System (Automatic Drafting Process of Directory in Accordance with DCF Standard) (Corresponding to the Second Aspect)

In the camera device 100 shown in FIG. 1, an arrangement maybe made so that, each time an HTML file is drafted, a directory in accordance with DCF standard is automatically formed. In other words, each time a picked-up image is linked to an HTML file, a thumb-nail size image of the picked-up image is formed, and registered by a file name in accordance with DCF standard. The file name to be registered is created by using a DCF directory number and a DCF fail number so that the directory position of the picked-up image can be recognized. In the above-mentioned registration of HTML file, the HTML files are stored by forming exclusively-used directories; however, those files may be registered in accordance with DCF standard as described below:

¥¥DCIM¥100RICOH¥RIMG0001.JPG
    ¥RIMG0002.JPG
    ¥RIMG0003.JPG
    ¥RIMG0004.JPG
    ¥RIMG0005.JPG
¥101RICOH¥RIMG0010.JPG
¥200RICOH
¥201HTML¥index.html
    ¥R1000001.JPG
    ¥R1000002.JPG
    ¥R1000003.JPG
    ¥R1000004.JPG
    ¥R1000005.JPG
    ¥R1000010.JPG
¥¥TEMPRATE¥TEMP001.TMP
    ¥TEMP0002.TMP
    ¥TEMP0003.TMP By carrying out the above-mentioned processes, it is possible to confirm the images that have been drafted as HTML through reproduction in a normal digital camera, and also to prevent the original picked-up images from being duplicated on the storage; thus, it becomes possible to save the memory.

3. System for New Registration (Part 1) (Corresponding to the Third Aspect)

The tag section of general-use HTML document, such as <IMG SRC . . . > </IMG>, can be automatically transferred to a tag, such as <PASTEIMAGE>, as shown in FIG. 2. For example, by using an HTML editor in a PC or the like, these are taken into the built-in memory 105 through the storage such as the attachable/detachable ATA 18 in the digital camera device 100 of FIG. 1 or CF 19, or taken into the built-in memory 105 by using a communication function of the modem 117 through the PCMCIA control section 114. The HTML files, thus taken in the built-in memory 105, are registered as templates in HTML format by using the LCD touch panel section 111.

At the time of registration, for example, in the case when <IMG SRC "1000001.jpg" WIDTH="320" HEIGHT="240" ALT="1"> or the like on normal HTML codes is detected, this is automatically transferred to an independent tag <PASTEIMAGE SHOT=param WIDTH="xxx" HEIGHT="xxx" > </PASTEIMAGE>. The sections, WIDTH, HEIGHT, may be used as they are. The section of SHOT may be uniformly transferred to ALLINFO, or may be provided with the following items prior to the automatic transferring process, which are displayed on the LCD touch panel section 111 as follows, thereby allowing the user to make a selection:

| | |
|---|---|
| "ALLINFO" | Paste all the files selected with ALLINFO information", |
| "SINGLEINFO" | Paste one image with information", |
| "ALL" | Paste all the files selected", |
| "SINGLE" | Paste one image", and |
| "INDEX" | Paste selected images as reduced images in lateral 5 rows". |

After the automatic transferring process, for example, these are registered in the built-in memory 105 as templates in HTML format, for example, "¥¥TEMPRATE¥TEMP001.TMP".

By carrying out the above-mentioned processes, it becomes possible to easily register an HTML document drafted by using an HTML editor or the like that is generally used in a PC in a digital camera device.

4. System for New Registration (Part 2) (Corresponding to the Fourth Aspect)

Based upon a file name specified by a tag section <IMG SRC . . . > of general-use HTML document, an automatic transferring process to a tag <PASTEIMAGE> shown in FIG. 2. In the aforementioned system for new registration (part 1), an automatic transferring process is unconditionally carried out based upon <IMGSRC . . . > </IMG> of general-use HTML document; however, in this system, for example, only when "TEMPRATE.jpg> of <IMG SRC "TEMPLATE.jpg-"WIDTH="320" HEIGHT="240" ALT="1"> is detected, the automatic transferring process is carried out.

By carrying out the above-mentioned processes, it becomes possible to easily register an HTML document, drafted by preliminarily registering an image file for HTML document drafting plate and using a general-use HTML editor or the like, in a digital camera device. Moreover, in comparison with the aforementioned system for new registration (part 1), since it is possible to identify <IMG SRC . . . > which should not be automatically transferred, it becomes possible to draft a template in HTML format using another type of still image on a HTML format template.

5. Re-editing System (Part 1) [Corresponding to the Fifth Aspect]

In a system as shown in FIG. 1, an HTML document drafting template registered in a digital camera device 100 as shown in FIG. 2 is displayed by using a dummy image file. While the HTML document drafting template is being displayed, the aforementioned exclusively-used tag section is reset. For example, in the digital camera device 100, the title name of an HTML format template is displayed as follows by using the LCD touch panel section 111:

"index display 01"

"index display 02"

"image display 01"

"image display 02"

"study-visit to show", or the like.

After the display of these, dummy images preliminarily registered in the system are displayed on the still image display section of the sample drawing of browser display image shown in FIGS. 4 and 5. Dummy images may be those having characters written thereon or those having a simple monocolor, as long as they are readily identified as image sections to be pasted. When the user selects an image section to be pasted, the following items are displayed by using the LCD touch panel section 111, thereby allowing the user to make a selection:

| | |
|---|---|
| "ALLINFO" | Paste all the files selected with ALLINFO information", |
| "SINGLEINFO" | Paste one image with information", |
| "ALL" | Paste all the files selected", |
| "SINGLE" | Paste one image", and |
| "INDEX" | Paste selected images as reduced images in lateral 5 rows". |

After the selection, this is re-registered in the built-in memory 105 as a template in HTML format, for example, "¥¥TEMPRATE¥TEMP0001.TMP".

By carrying out the above-mentioned processes, it becomes possible to re-edit an HTML drafting template registered in a digital camera.

6. Re-editing System (Part 2) [Corresponding to the Sixth Aspect]

In a digital camera 100 as shown in FIG. 1, an exclusively-used tag for HTML document drafting template is automatically converted to comments. In this case, an exclusively-used tag that has been converted to comments is recognized, and transferred to an exclusively-used tag. For example, in a digital camera 100 shown in FIG. 1, the title name of an HTML format template is displayed as follows by using the LCD touch panel section 111:

"index display 01"

"index display 02"

"image display 01"

"image display 02"

"study-visit to show", or the like. After displaying these, the exclusively-used tag sections of HTML template as shown in FIG. 2 selected by the user are automatically converted to comments on HTML codes as shown in FIG. 3. After the conversion, these are taken into the external PC 200 through the storage such as the attachable/detachable ATA 18 in the digital camera device 100 of FIG. 1 or CF 19, or taken out externally through the serial I/F control section 112 or USBI/F control section 113, or taken into an external device through a communication function of the modem 117 via the PCMCIA control section 114.

With respect to the HTML files, thus taken out, the HTML templates are edited by using a text editor or the like in PCs or an HTML editor. In this case, since the sections of the exclusively-used tags have been converted to comments, these are displayed on the HTML editor and the browser without any problems. After the HTML files have been edited in the PC 200, these are taken into the built-in memory 105 through the storage such as the ATA 18 or CF 19, or taken into the built-in memory 105 through the serial I/F control section 112 or USB I/F control section 113, or taken into the built-in memory 105 by using a communication function of the modem 117 through the PCMCIA control section 114. The HTML files, thus taken in the built-in memory 105, are registered as templates in HTML format by using the LCD touch panel section 111. At the time of registration, independent tags, converted into comments on HTML codes, are detected, and automatically transferred into independent tags. After having been automatically transferred, these are registered in the built-in memory 105 as templates in HTML format such as "¥¥TEMPRATE¥TEMP0001.TMP".

By using the above-mentioned processes, it becomes possible to take out HTML drafting templates registered in a digital camera device to a PC and to register again in the digital camera after re-editing these by using a general-use HTML editor or the like.

7. Control System of HTML File Size (Part 1) [Corresponding to the Seventh Aspect]

In a digital camera device 100 shown in FIG. 1, each time a picked-up image is linked to an HTML document, the size of the image file thus linked and the total size of image files that have been linked before are displayed. On HTML documents, a link of the original picked-up image connected to a thumb-nail size image may be cut or connected. For example, at the time of automatic formation of HTML, each time a picked-up image is linked, the total size of the HTML file and the still image file linked thereto and the file size are displayed on the display section of the LCD touch panel section 111 of the digital camera device 100 shown in FIG. 1. At this time, a confirmation message such as "Is this still image file to be linked?" is displayed on the LCD touch panel 111. While confirming the total size and the size of the file thus displayed, the user can make a determination as to whether or not a link is made to the HTML file.

By carrying out the above-mentioned processes, it becomes possible to control the ever-increasing size of HTML files for each image file section.

8. Control System of HTML File Size (Part 2) [Corresponding to the Eighth Aspect]

In a digital camera device 100 shown in FIG. 1, each time a picked-up image is linked to an HTML document, the total size of the image file thus linked is displayed, and after formation of an HTML document, the size of the original picked-up image that has been uniformly linked is reduced to a desired size. For example, at the time of automatic formation of HTML, each time a picked-up image is linked, the total size of the HTML file and the still image file linked thereto and the file size are displayed on the display section of the LCD touch panel section 111 of the digital camera device 100.

After all the still images have been linked, a confirmation message is displayed as follows:

"Is this total size OK?"

"Reduce linked still image to ½"

"Reduce linked still image to ¼"

"Reduce linked still image to ⅛"

"Reduce linked still image to ¹⁄₁₆".

While confirming the total size thus displayed, the user determines as to whether or not the size of the HTML files should be reduced uniformly. Upon selection of reduction, the still images that have been linked are variably reduced uniformly.

By carrying out the above-mentioned processes, it becomes possible to control the ever-increasing size of HTML files to a desired size in a uniformed manner.

9. Link System of Sound Relation Files [Corresponding to the Ninth Aspect]

In a digital camera device 100 shown in FIG. 1, each time a picked-up image is linked to an HTML document, it is determined whether or not any relation file is attached to the picked-up image. The link relationship between the still image and the sound file is explained by, for example, the following directory construction:

¥¥DCIM¥100RICOH¥RIMG0001.JPG

¥RIMG0001.WAV

¥RIMG0002.JPG

¥RIMG0002.WAV

¥RIMG0003.JPG

¥RIMG0004.JPG
¥RIMG0005.JPG
¥101RICOH¥RIMG0010.JPG
¥200RICOH
¥201RHTML¥index.html
　¥R1000001.JPG
　¥R1000001.WAV
　¥R1000002.JPG
　¥R1000002.WAV
　¥R1000003.JPG
　¥R1000004.JPG
　¥R1000005.JPG
　¥R1000010.JPG
¥¥TEMPRATE¥TEMP0001. TMP
　¥TEMP0002.TMP
　¥TEMP0003.TMP Moreover, in the case when there is any sound relation file, an icon is displayed, which indicates that there is any sound relation file attached to the picked-up image that is linked to an HTML document. The sound relation file is linked to the display icon. For example, in the case when the above-mentioned linked still image is linked by any sound file, an icon is displayed on the display image shown in FIGS. 4 and 5, which indicates that there is any sound relation file attached. The displayed icon is described in a manner so as to have the sound information linked on HTML codes.

By carrying out the above-mentioned processes, it becomes possible to link sound relation file corresponding to a picked-up image to an HTML document.

10. Version Update of Template [Corresponding to the Tenth Aspect]

In a digital camera device 100 shown in FIG. 1, a template file in HTML format is downloaded from a predetermined home page on the Internet by using a communication card such as a modem card and an ISDN card, and the downloaded template file in HTML format is registered in the digital camera 100. This downloading process and registering process are executed by the CPU 102 that controls various control sections so that the downloaded files are stored in the built-in memory 105.

By carrying out the above-mentioned processes, the template file in HTML format, registered in the digital camera device 100, can be readily updated by way of the Internet.

In accordance with the inventions arranged as described above, the following effects are obtained.

According to the first aspect of the present invention, the digital camera device is provided with: a unit which preliminarily registers a template in HTML format for creating an HTML file in the digital camera device; a unit which uses a tag exclusively used for inserting a file of a picked-up image; a unit which automatically generates HTML codes by inserting the image file in accordance with the tag used in the template; a unit which, each time an HTML file is created, automatically forms a new directory to register the HTML file therein; a unit which, each time a picked-up image is linked to an HTML file, forms an image with a thumb-nail image size from the picked-up image in accordance with the exclusively-used tag and registers this in the same directory as the HTML file registered; and a unit which displays the image with the thumb-nail size on HTML codes with a link to the corresponding original picked-up image being pasted thereon. Therefore, a template is formed in HTML format by using a PC, or the like, and this is taken into the digital camera, and when the template is specified so as to start a process with a single or a plurality of images being selected in the digital camera, an image-associating (pasting) process in accordance with independent tags is carried out. Since only the sections of the independent tags are converted with the other sections being left as they are, even those having a complex layout can be described so that a template is easily added.

According to the second aspect of the present invention, the digital camera device is provided with: a unit which automatically creates a directory in accordance with DCF standard, each time the HTML document is created; a unit which, each time a picked-up image is linked to the HTML file, forms an image with a thumb-nail image size from the picked-up image, and registers this with a file name in accordance with DCF standard; and a unit which creates the registering file name by using DCF directory number and DCF file number so that the directory position of the picked-up image is recognized. Therefore, it becomes possible to confirm an image that has been formed into an HTML document, through reproduction in a normal digital camera, and by preventing the original picked-up image from being duplicated on a storage, it becomes possible to save the memory.

According to the third aspect of the present invention, since a section of <IMG SRC . . . > tag in general-use HTML document is automatically transferred to <PASTEIMAGE> tag, it becomes possible to easily register an HTML document, drafted by using an HTML editor or the like generally used in PCs, in a digital camera device.

According to the fourth aspect of the present invention, an automatic transfer operation to <PASTEIMAGE> tag is automatically carried out based upon a file name specified by a section of <IMG SRC . . . > tag in general use HTML document. Therefore, an HTML document, which has been formed by using a general-use HTML editor after preliminarily registering an image file for an HTML document drafting plate, can be easily registered in a digital camera device.

According to the fifth aspect of the present invention, the HTML document drafting template, registered in the digital camera device, is displayed by using a dummy image file so that the exclusively-used tag section is reset while displaying the HTML document drafting template. Therefore, it becomes possible to re-edit the HTML document drafting template registered in the digital camera.

According to the sixth aspect of the present invention, the exclusively-used tag of the HTML document drafting template is automatically converted to comments, and the exclusively-used tag converted into comments is recognized and converted into exclusively-used tag. Therefore, the HTML drafting template, registered in the digital camera, is taken out to a PC, and after re-editing this by using a general-use HTML editor or the like, is again registered in the digital camera.

According to the seventh aspect of the present invention, each time a picked-up image is linked to an HTML document, the size of the image file thus linked and the total size of image files that have been linked before are displayed, and connection or disconnection of the link of the original picked-up image to or from an image with a thumb-nail size on HTML document are carried out. Therefore, it is possible to limit ever-increasing HTML file sizes for each image file section to be linked.

According to the eighth aspect of the present invention, each time a picked-up image is linked to an HTML document, the total size of an image file thus linked is displayed, and after forming an HTML document, the size of the original picked-up image linked in a uniformed manner is reduced to a desired size. Therefore, it is possible to control ever-increasing HTML file sizes to a desired size at once.

According to the ninth aspect of the present invention, each time a picked-up image is linked to an HTML document, it is determined whether or not there is any sound relation file attached to the picked up image, and if there is any sound relation file, an icon indicating the existence of the sound relation file attached to the picked-up image linked to the HTML document is displayed. Further, the sound relation file is linked to the display icon. Therefore, it is possible to link a sound relation file corresponding to a picked-up image to the corresponding HTML document.

According to the tenth aspect of the present invention, a template file in HTML format is downloaded from a predetermined home page on the Internet, by using a communication card including a modem card and an ISDN card, and the template file in HTML format that has been downloaded is registered in the digital camera device. Therefore, the template file in HTML format, registered in the digital camera device, can be readily updated by way of the Internet.

The present document incorporates by reference the entire contents of Japanese priority document, 2000-401592 filed in Japan on Dec. 28, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera device, which has functions for creating an HTML document file from a picked-up image and for taking out the HTML document file through a media and communication, comprising:
   a unit which preliminarily registers a template in HTML format for creating an HTML file in the digital camera device;
   a unit which uses a tag exclusively used for inserting a file of a picked-up image;
   a unit which automatically generates HTML codes by inserting the image file in accordance with said tag;
   a unit which, each time an HTML file is created, automatically forms a new directory to register the HTML file therein;
   a unit which, each time a picked-up image is linked to an HTML file, forms an image with a thumb-nail image size from the picked-up image in accordance with the exclusively-used tag and registers this in the same directory as the HTML file is registered;
   a unit which displays the image with the thumb-nail size on HTML codes with a link to the corresponding original picked-up image being pasted thereon;
   a unit which, each time a picked-up image is linked to an HTML document, determines as to whether or not there is a sound relation file attached to the picked up image;
   a unit which, if there is any sound relation file, displays an icon indicating the existence of the sound relation file attached to the picked-up image linked to the HTML document;
   a unit which links the sound relation file to the display icon;
   a unit which displays the HTML document drafting template registered in the digital camera device by using a dummy image file; and
   a unit which resets the exclusively-used tag section while displaying the HTML document drafting template;
   a unit which, each time a picked-up image is linked to an HTML document, displays a size of an image file just linked and the total size of a plurality of image files that have been linked before; and
   a unit which, after forming an HTML document, reduces the size of one or more of the original picked-up images linked in a uniformed manner to a desired size.

2. The digital camera device according to claim 1, further comprising:
   a unit which automatically creates a directory in accordance with DCF standard, each time the HTML document is created;
   a unit which, each time a picked-up image is linked to the HTML file, forms an image with a thumb-nail size from the picked-up image, and registers this with a file name in accordance with DCF standard; and
   a unit which creates the registering file name by using DCF directory number and DCF file number so that the directory position of the picked-up image is recognized.

3. The digital camera device according to claim 1, further comprising:
   a unit which automatically transfers a section of <IMG SRC . . . > tag in general-use HTML document to a <PASTEIMAGE> tag.

4. The digital camera device according to claim 1, further comprising:
   a unit which carries out an automatic transfer operation to a <PASTEIMAGE> tag based upon a file name specified by a section of <IMG SRC . . . > tag in general use HTML document.

5. The digital camera device according to claim 1, further comprising:
   a unit which automatically converts the exclusively-used tag of the HTML document drafting template to comments; and
   a unit which recognizes the exclusively-used tag converted into comments and converts these comments into exclusively-used tag.

6. The digital camera device according to claim 1, further comprising:
   a unit which enables to connect or disconnect the link of the original picked-up image to or from an image with a thumb-nail size on HTML document.

7. The digital camera device according to claim 1, further comprising:
   a unit which downloads a template file in HTML format from a predetermined home page on the Internet, by using a communication card including a modem card and an ISDN card; and
   a unit which registers the template file in HTML format that has been downloaded.

* * * * *